US007318539B2

(12) United States Patent
Vitantonio et al.

(10) Patent No.: US 7,318,539 B2
(45) Date of Patent: Jan. 15, 2008

(54) PUMP DRIVE UNIT FOR BATTERY OPERATED FLUID DISPENSERS

(75) Inventors: Marc L. Vitantonio, South Russell, OH (US); Craig M. Saunders, Rocky River, OH (US); Donald C. Fuchs, Jr., Mentor, OH (US); Daniel J. Wanhainen, Twinsburg, OH (US)

(73) Assignee: Power Sprayer LLC, Cleveland, OH (US)

( * ) Notice: Subject to any disclaimer, the term of this patent is extended or adjusted under 35 U.S.C. 154(b) by 644 days.

(21) Appl. No.: 10/823,258

(22) Filed: Apr. 13, 2004

(65) Prior Publication Data

US 2004/0211792 A1 Oct. 28, 2004

Related U.S. Application Data

(60) Provisional application No. 60/465,438, filed on Apr. 28, 2003.

(51) Int. Cl.
*B65D 88/54* (2006.01)
*F16H 53/00* (2006.01)

(52) U.S. Cl. ........................ 222/333; 417/470; 74/567; 74/569

(58) Field of Classification Search ............. 222/321.1, 222/321.7, 8, 333, 63, 401, 381, 381.1, 321.8; 239/527, 525, 333, 337, 331, 332, 329, 463, 239/469, 471; 417/411, 415, 470; 74/567, 74/569
See application file for complete search history.

(56) References Cited

U.S. PATENT DOCUMENTS 2,629,539 A * 2/1953 Drewes, Jr. ................. 417/419
3,120,347 A 2/1964 Duke
3,173,584 A 3/1965 Giavasis
3,255,967 A 6/1966 Kenney
3,762,647 A 10/1973 Tada
3,901,449 A 8/1975 Bochmann
3,904,116 A * 9/1975 Jones et al. ................. 239/127
3,973,700 A 8/1976 Schmidt et al.

(Continued)

FOREIGN PATENT DOCUMENTS

DE 3124441 6/1982

(Continued)

*Primary Examiner*—Kevin Shaver
*Assistant Examiner*—Stephanie E. Tyler
(74) *Attorney, Agent, or Firm*—Fay Sharpe LLP; Brian E. Turung

(57) ABSTRACT

A battery operated, handheld fluid dispenser comprises a supply container having a body portion and a narrow neck extending upwardly therefrom. A pump and discharge unit is mounted on the upper end of the neck and comprises a pump diaphragm and pump chamber for pumping liquid from the container to a discharge nozzle. A battery powered pump drive unit is mounted on the container and comprises an electric motor having an output shaft coupled with the pump diaphragm through a cam and cam follower arrangement to displace the diaphragm through a pump stroke when the motor is energized. The cam is rotatably driven by the motor, and the cam follower is attached to the diaphragm, whereby rotation of said cam axially displaces the diaphragm, and the cam and cam follower have interengaging dual cam faces for balancing lateral forces therebetween during rotation of said cam relative to said cam follower.

23 Claims, 4 Drawing Sheets

U.S. PATENT DOCUMENTS

| | | | | |
|---|---|---|---|---|
| 3,993,250 | A | 11/1976 | Shure | |
| 3,995,774 | A | 12/1976 | Cooprider et al. | |
| 4,082,223 | A | 4/1978 | Nozawa | |
| 4,154,375 | A | 5/1979 | Bippus | |
| 4,155,487 | A | 5/1979 | Blake | |
| 4,187,959 | A | 2/1980 | Pelton | |
| 4,199,083 | A | 4/1980 | LoMaglio | |
| 4,204,614 | A | 5/1980 | Reeve | |
| 4,230,277 | A | 10/1980 | Tada | |
| 4,260,079 | A | 4/1981 | Cary et al. | |
| 4,273,290 | A | 6/1981 | Quinn | |
| 4,558,821 | A | 12/1985 | Tada et al. | |
| 4,655,690 | A | 4/1987 | Boedecker et al. | |
| 4,693,423 | A | 9/1987 | Roe et al. | |
| 4,790,454 | A | 12/1988 | Clark et al. | |
| 4,819,835 | A | 4/1989 | Tasaki | |
| 4,858,788 | A | 8/1989 | Meckenstock | |
| 4,873,932 | A * | 10/1989 | Adams | 112/443 |
| 4,898,307 | A | 2/1990 | Tiramani | |
| 4,911,361 | A | 3/1990 | Tada | |
| 4,958,754 | A | 9/1990 | Dennis | |
| 5,150,841 | A | 9/1992 | Silvenis et al. | |
| 5,299,717 | A | 4/1994 | Geier | |
| 5,303,867 | A | 4/1994 | Peterson | |
| 5,338,495 | A * | 8/1994 | Steiner et al. | 261/28 |
| 5,341,965 | A | 8/1994 | Maas et al. | |
| 5,356,049 | A | 10/1994 | Harris et al. | |
| 5,385,302 | A | 1/1995 | Foster et al. | |
| 5,397,034 | A | 3/1995 | Wunsch | |
| 5,402,916 | A | 4/1995 | Nottingham et al. | |
| 5,531,137 | A * | 7/1996 | Guilford | 74/569 |
| 5,716,007 | A | 2/1998 | Nottingham et al. | |
| 5,716,008 | A | 2/1998 | Nottingham et al. | |
| 6,405,698 | B1 * | 6/2002 | Steinmetz | 123/90.48 |

FOREIGN PATENT DOCUMENTS

| | | |
|---|---|---|
| DE | 3314021 | 10/1984 |
| EP | 0117898 | 9/1984 |

* cited by examiner

PUMP DRIVE UNIT FOR BATTERY OPERATED FLUID DISPENSERS

CROSS-REFERENCE TO RELATED APPLICATIONS

This application claims priority from U.S. Provisional Patent Application Ser. No. 60/465,438 filed Apr. 28, 2003.

BACKGROUND OF THE INVENTION

This invention relates to the art of handheld fluid dispensers and, more particularly, to improvements in the pump drive unit of a battery operated, handheld fluid dispenser.

A battery operated, motorized fluid dispenser of the character to which the present invention is directed is shown, for example, in U.S. Pat. No. 5,716,007 to Nottingham, et al. which is assigned to the same assignee as the present invention and which is hereby incorporated herein by reference. In the latter dispenser, an electric motor is selectively connected to a battery source by a push button or trigger operated switch and, when energized, the motor operates a pump mechanism by which fluid in a supply container associated with the dispenser is pumped through a discharge opening.

While the battery operated dispenser in the Nottingham, et al. patent operates satisfactorily, component parts in the pumping mechanism are subjected to forces and frictional interengagement which causes undesirable wear of the parts, undesirable loading of the electric motor, and undesirably fast drainage of the batteries. More particularly in this respect, the pump driving arrangement includes an electric motor having an output shaft coaxial with the pump and carrying a cam which is cooperable with an aligned cam follower on the movable component of the pump such that rotation of the motor output shaft is translated into axial displacement of the follower and pump element in a cylinder portion of the pump. Each of the aligned cam and cam follower has a planar cam surface inclined at the same angle relative to the drive shaft and pump axes and coaxial therewith. The cam follower associated with the pump element is restrained against rotation relative to the motor shaft and pump axes, whereby the cam face on the cam component mounted on the motor shaft rotates relative to the cam face of the cam follower between full facial engagement therewith when the pump element is at one end of the stroke thereof and engagement of the radially outer edges of the axially outer ends of the cam and follower components when the pump element is at the other end of the stroke thereof. The interengaging relationship between the cam faces during relative rotation therebetween radially loads the drive motor shaft and the cam follower and pump element, and radially loads the interengaging portions of the cam faces during relative rotation therebetween. Such loading of the cam faces not only promotes wear therebetween but uneven wear. Moreover, radial loading of the cam follower urges the latter against the cylinder portion of the pump and, together with radial loading of the motor shaft, imposes loads on the motor which in turn causes undesirably high drainage of the batteries. All of these undesirable loading characteristics impose frictional interengagement between the parts which undesirably affects performance of the drive unit and pump element. Moreover, maintenance and/or part replacement resulting from wearing of the component parts and battery drainage is undesirably high.

SUMMARY OF THE INVENTION

In accordance with the present invention, battery operated fluid dispensers are provided with an improved pump drive unit by which the foregoing and other disadvantages are minimized or overcome. More particularly, in a pump drive unit according to the invention, the aligned cam and cam follower respectively associated with the electric motor and the pump element each have dual cam surfaces or faces cooperatively interengaging to achieve pump element displacement through the full stroke of the pump in a manner which provides balanced radial or lateral thrust forces on opposite sides of the motor shaft, cam follower and pump element. This relationship advantageously reduces not only the amount of wear between the cam components but the uneven wear thereof experienced with single cam face components. Moreover, balanced loading of the motor shaft, follower and pump element reduces undesirable loading of the electric motor and thus battery drain, thus providing a longer life for the drive system, improved battery life, and improved performance of the pump element.

Another improvement in accordance with the invention resides in providing rollers on laterally opposite sides of the cam follower which ride in corresponding slots in the cam follower support. The rollers and slots interengage to preclude rotation of the cam follower relative to its support, and the interengagement between the slots and rollers advantageously reduces friction between the component parts during axial movement of the cam follower.

It is accordingly and outstanding object of the present invention to provide improvements in connection with the pump and pump drive unit of a battery operated fluid dispenser.

Another object is the provision of a fluid dispenser pump drive unit comprising driving and driven cam components structured for thrust forces therebetween during operation of the pump to be balanced.

A further object is the provision of a pump drive unit of the foregoing character which provides for a more uniform wearing of the interengaging cam surfaces than achieved with cam drive arrangements heretofore provided.

Yet another object is the provision of a pump drive unit of the foregoing character providing improved performance of the pump during the operation of the pump.

Yet a further object is the provision of a pump drive unit of the foregoing character which reduces loading of the electric motor, thus increasing the life thereof and reducing battery drainage so as to improve battery life.

Still another object is the provision of a pump drive unit of the foregoing character which results in improved performance of the pump element during operation thereof.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which.

DESCRIPTION OF PREFERRED EMBODIMENTS

Figure 1:
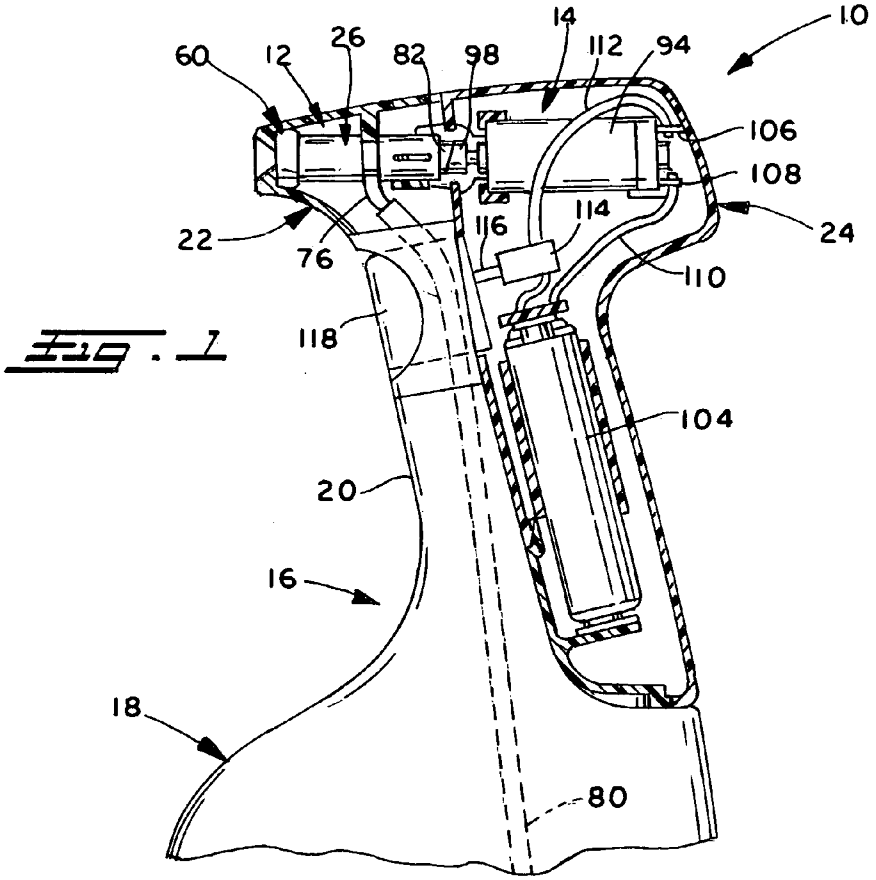
FIG. 1 is a side elevation view, partially in section, of a portion of a liquid dispenser in accordance with the invention.

Referring now in greater detail to the drawings, wherein the showings are for the purpose of illustrating preferred embodiments of the invention only, and not for the purpose of limiting the invention, FIG. 1 illustrates a fluid dispenser 10 comprising a pumping unit 12 and a pump driving unit 14 mounted on a supply container 16. Container 16 includes a lower body portion 18, only a portion of which is shown, and a narrow neck portion 20 extending upwardly therefrom, and pumping unit 12 and pump drive unit 14 are respectively enclosed in housings 22 and 24 contoured to provide a desired spray head profile with one another and with adjacent portions of container 16.

Figure 2:
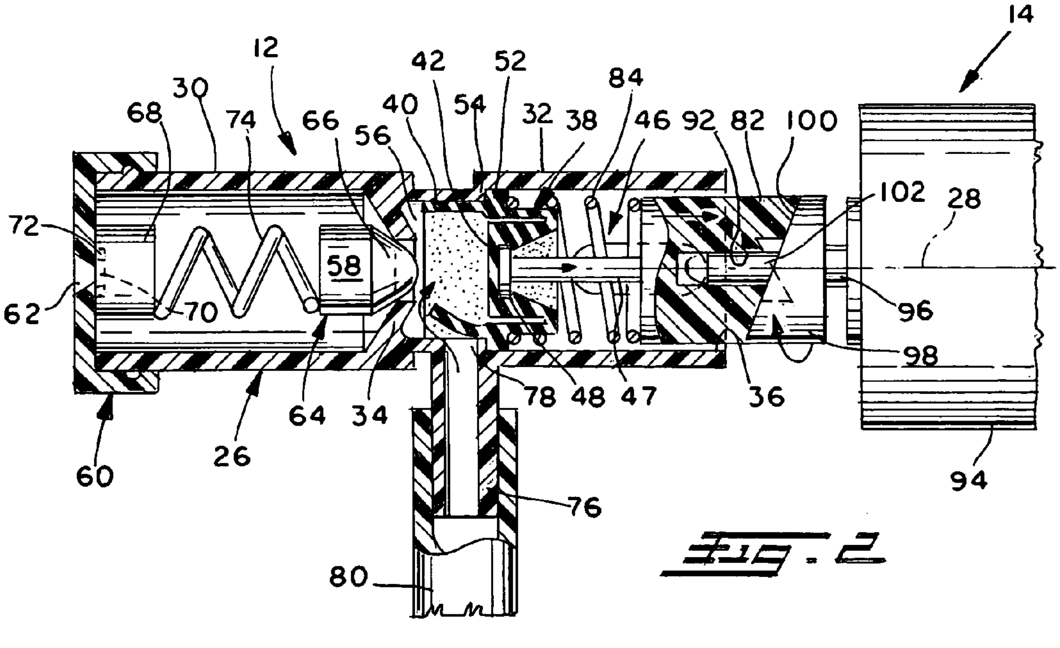
FIG. 2 is a sectional elevation view showing the pumping and pump driving components in the positions thereof following the suction stroke of the pump.
Figure 3:
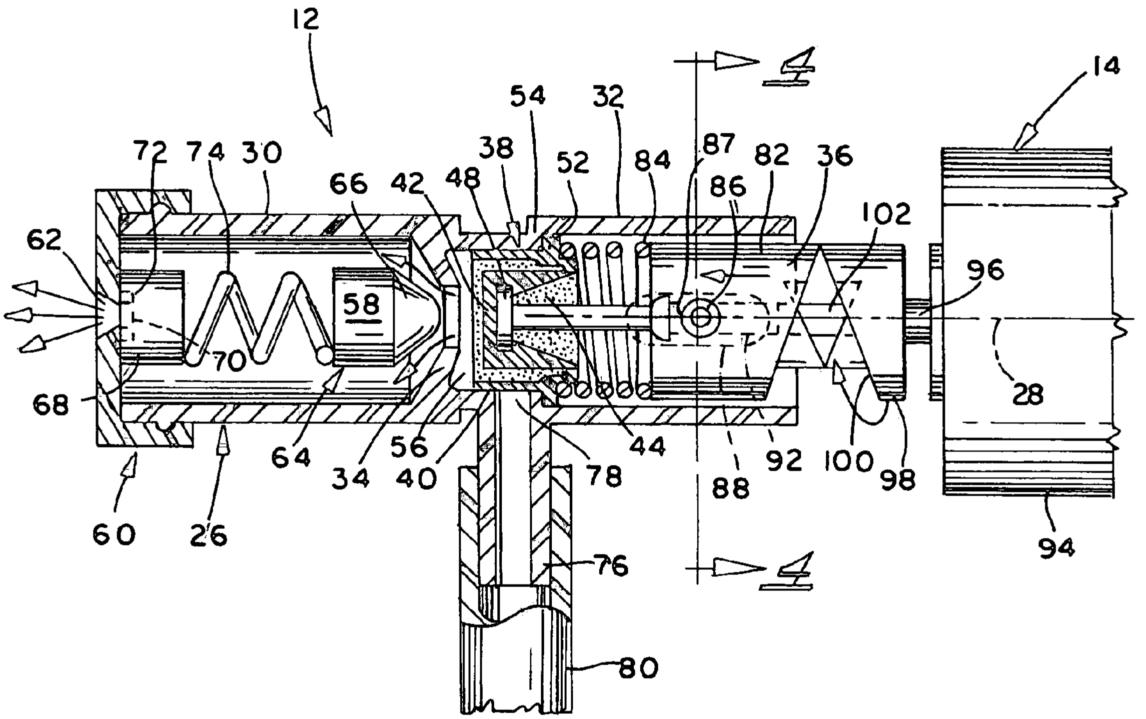
FIG. 3 is a sectional elevation view showing the pumping and pump driving components in the positions thereof following the discharge stroke of the pump.

As best seen in FIGS. 2 and 3, pumping unit 12 includes a cylindrical body member 26 having an axis 28 and providing an axially outer discharge tube portion 30 and an axially inner pump portion 32, which portions 30 and 32 are separated internally of member 26 by a radially inwardly extending peripheral wall 34 therebetween. The pump for the dispenser includes a pump cylinder defined by the interior of portion 32 and having a front end defined by wall 34 and an open rear end 36. The pump further includes a pump diaphragm 38 of suitable rubber material having a circular wall portion 40 received in the pump chamber and providing an open diaphragm end adjacent front wall 34 of the chamber. The pump diaphragm further includes a closed outer end defined by an end wall 42 transverse to axis 28 and a reentrant portion 44 of the side wall of the diaphragm. A pump diaphragm actuator element 46 has a stem 47 extending to an inner end 48 received in an annular recess 50 in the reentrant portion of the diaphragm such that end wall 42 is axially displaceable with actuator member 46 as will become apparent hereinafter. Diaphragm 38 includes a radially outwardly extending peripheral flange 52 intermediate the opposite ends thereof which abuts against a radially inwardly extending peripheral shoulder 54 of pump portion 32 of body member 26 to axially position the inner end of diaphragm wall 40 relative to front wall 34 of the pump cylinder. Wall 34 and diaphragm 38 cooperatively provide a variable volume pump chamber 56.

Wall 34 includes an outlet opening 58 coaxial with axis 28, and the axially outer end of discharge tube portion 30 of body member 26 receives and supports a nozzle component 60 having a discharge outlet 62 coaxial with axis 28 and through which fluid from container 16 is pumped as will become apparent hereinafter. A discharge control valve element 64 is reciprocally supported in discharge tube portion 30 and has an inner end 66 adapted to move axially relative to opening 58 between engaged and disengaged positions relative to the axially outer edge of the opening which provides a valve seat for valve element 64. A spinner element 68 abuts against the inner side of nozzle member 60 and has an outer end coaxial with axis 28 and provided in a well-known manner with an axially inwardly extending recess 70 and ports 72 opening laterally thereinto so as to impart a swirling motion to fluid pumped through outlet tube portion 30 and thence through discharge opening 62. A biasing spring 74 is disposed between valve element 64 and spinner element 68 and, preferably, is integral therewith. Accordingly, it will appreciated that displacement of valve element 64 to the left from its position shown in FIG. 2 to its position shown in FIG. 3 is against the bias of spring 74, and such displacement of the valve element is responsive to fluid pressure in pump chamber 56. Upon displacement of the valve element from engagement with the valve seat, fluid flows across the valve element and thence through discharge tube portion 30 to spinner element 68, laterally inwardly through ports 72 to recess 70 and thence through discharge opening 62.

Body member 26 further includes an inlet conduit 76 integral with and extending downwardly therefrom, and an inlet opening 78 in the pump cylinder wall which communicates the interior of tube 76 with pump chamber 56. The lower end of inlet tube 76 receives the upper end of a dip tube 80 which extends downwardly into supply container 16 for delivering fluid from the container to the pump chamber during operation of the sprayer. The axially inner end of pump diaphragm wall 40 overlies inlet opening 78 and provides a check valve which permits fluid to enter pump chamber 56 from supply container 16 during the suction stroke of the pump and precludes the flow of fluid in pump chamber 56 through inlet opening 78 during the discharge stroke of the pump.

Figure 4:
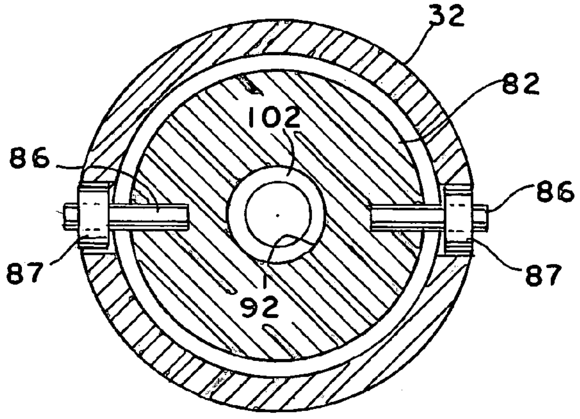
FIG. 4 is a cross-sectional elevation view of the cam follower roller supporting arrangement taken along line 4-4 in FIG. 3.

As mentioned hereinabove, axially inner end 48 of diaphragm actuator 46 interengages with the re-entrant portion of pump diaphragm 38 such that movable end 42 of the pump diaphragm is axially displaceable with the actuator member. As will be appreciated from FIGS. 2 and 3 of the drawing, actuator 46 and thus diaphragm end 42 are axially displaceable toward and away from pump chamber wall 34. As will be further appreciated from the latter figures, displacement of diaphragm end 42 from the position shown in FIG. 2 to the position shown in FIG. 3 provides the discharge stroke for the pump, and displacement of the diaphragm end from the position shown in FIG. 3 to the position shown in FIG. 2 provides the suction stroke for the pump. The axially outer end of diaphragm actuator 46 is provided with a cam follower 82 by which the actuator and thus diaphragm end 42 are displaced from the position shown in FIG. 2 to the position shown in FIG. 3 as described in greater detail hereinafter, and a compression spring 84 is provided between diaphragm flange 52 and the axially inner end of cam follower 82 to bias actuator 46 and thus diaphragm end 42 to the position shown in FIG. 2. In accordance with one aspect of the invention, as will be appreciated from FIG. 4, cam follower 82 is provided with diametrically opposed radially outwardly extending pins 86 carrying rollers 87 which are received in a corresponding axially extending opening 88 in pump cylinder portion 32 of body member 26. Rollers 87 roll in openings 88 and engage the axially outer end thereof to limit displacement of actuator 46 and thus diaphragm end 42 to the right in FIG. 2 under the influence of biasing spring 84. Moreover, the rollers restrain relative rotation between can follower 82 and cylinder 32 and promote relative axial displacement therebetween with minimal friction. For the purpose which will become apparent hereinafter, follower cam 82 has an axially inwardly extending bore 92 coaxial with axis 28.

Pump drive unit 14 comprises an electric motor 94 having a rotatable output shaft 96 which is coaxial with axis 28 when the pump drive unit including housing 24 is mounted on supply container 16 in operative relationship with pumping unit 12. The outer end of shaft 96 is provided with a cam member 98 which is suitably secured to shaft 96 for rotation therewith. As will be described in greater detail hereinafter, cam 98 and cam follower 82 have cam faces interengaging to axially displace cam follower 82 and thus diaphragm end 42 in response to rotation of cam 98. Cam member 98 further includes a circular projection 102 coaxial with axis 28. Projection 102 extends axially outwardly from cam 98 and is axially slidably and rotatably received in bore 92 in cam member 82 for the purpose set forth hereinafter.

As will be appreciated from FIG. 1 of the drawing, housing 24 of pump drive unit 14 encloses a power supply for motor 94 which, in the embodiment disclosed, comprises a battery pack 104 having positive and negative terminals, not designated numerically, connected to motor terminals 106 and 108 by lines 110 and 112 and a control switch 114 in line 112. Switch 114 is a push-button type switch having an operating stem 116 extending therefrom and provided on its outer end with an operating or trigger member 118 by which the switch is actuated as will become apparent hereinafter. Switch 114 is normally open and is closed by displacing trigger member 118 to the right from the position thereof shown in FIG. 1. When closed, switch 114 connects motor 94 across battery pack 104, whereby the motor is energized to rotate output shaft 96 thereof and thus cam member 98 on the outer end of the shaft. As will be appreciated from FIGS. 2 and 3 of the drawing, rotation of cam member 98 180° from the position shown in FIG. 2 to the position shown in FIG. 3 axially displaces cam follower 82 and thus pump diaphragm wall 42 through the discharge stroke thereof against the bias of return spring 84. Rotation of cam member 98 180° from the position shown in FIG. 3 to the position shown in FIG. 2 provides for cam 82 and thus pump diaphragm wall 42 to return to their initial positions under the influence of biasing spring 84 to provide the suction stroke of the pump. During rotation of cam 98 and axial reciprocation of cam follower 82 resulting therefrom, projection 102 and bore 92 interengage to preclude relative lateral displacement between the cam members, thus to maintain the coaxial relationship therebetween. It will be appreciated that motor shaft 96 rotates continuously when switch 114 is closed whereby the pump continuously cycles through the discharge and suction strokes thereof so as to pump liquid from container 16 through discharge opening 62 until such time as the user releases switch trigger 118.

Figure 5:
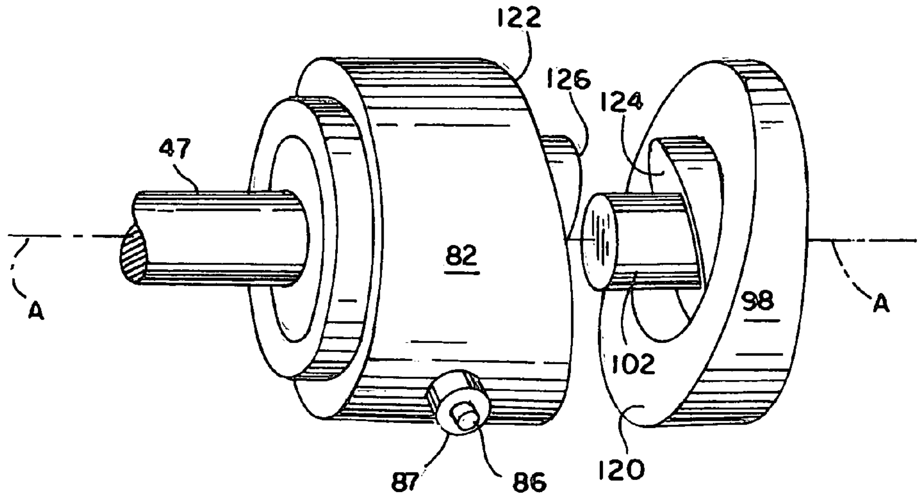
FIG. 5 is a perspective view of the dual cam drive arrangement for displacing the pump element during a liquid pumping operation.
Figure 6A:
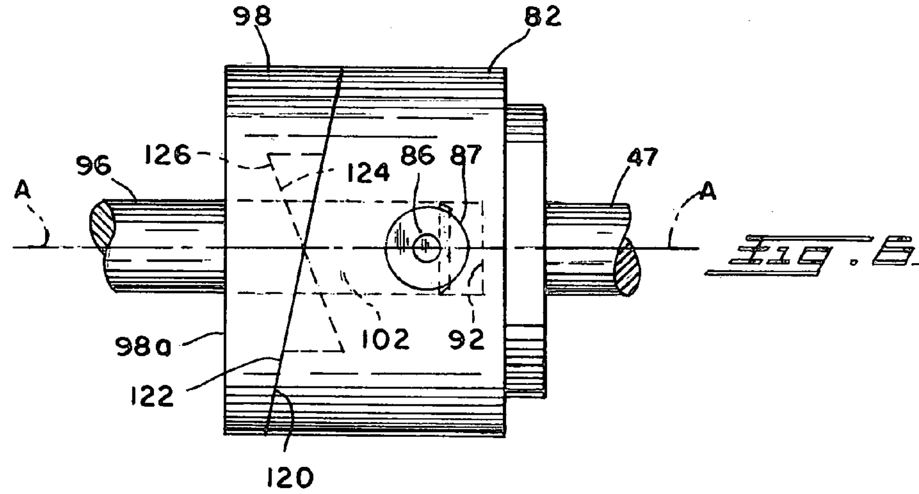
FIG. 6A is a side elevation view of the cam and cam follower in the positions thereof following the suction stroke of the pump.
Figure 6B:
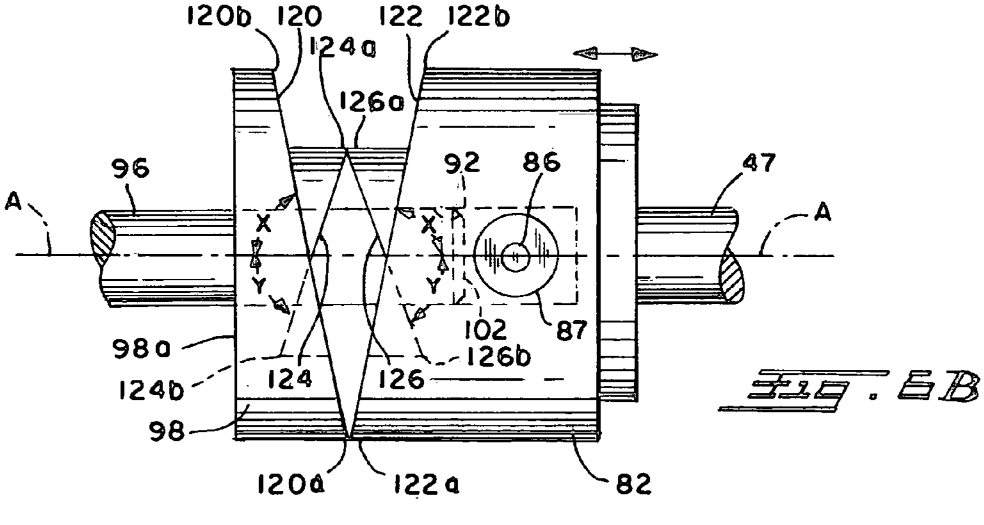
FIG. 6B is a side elevation view of the cam and cam follower in the positions thereof at the end of the discharge stroke of the pump; and, FIG. 7 is a perspective view of another embodiment of the roller supporting arrangement for the cam follower.

In accordance with the present invention, and as best seen in FIGS. 5, 6A, and 6B, cam 98 and cam follower 82 are each provided with dual cam faces for balancing the lateral forces imposed on the pump and pump drive unit components during pumping operation. More particularly in this respect, each of the cam and cam follower components has an axis A and, when assembled, the cam and cam follower are coaxial. Further, cam 98 and cam follower 82 have first cam faces 120 and 122, respectively, each at the same angle x relative to the corresponding axis A, and the cam and cam follower have second cam faces 124 and 126, respectively, each at the same angle y to the corresponding axis A. The first and second cam faces of each of the cam and cam follower components are circular transverse to the corresponding axis A, and the first cam faces of the cam and cam follower components have an outer diameter which is greater than that of the second cam faces of the cam and cam follower. This relationship provides for angles x and y to be different. Moreover, each of the first cam faces 120 and 122 respectively has an axially outermost point 120*a* and 122*a* and an axially innermost point 120*b* and 122*b* on the corresponding outer diameter. Likewise, each of the second cam faces 124 and 126 respectively has an axially outermost point 124*a* and 126*a* and an axially innermost point 124*b* and 126*b* on the corresponding diameter. Still further, the axially outermost points of the first and second cam faces of each of the cam and cam follower components are diametrically opposed and in a plane transverse to the axis A thereof. In this respect, for example, the axially outermost points 120*a* and 124*a* of the first and second cam faces of cam 98 are offset by 180° and thus are diametrically opposed, and extend the same axial distance from base 98*a* of cam 98 and thus are in a plane transverse to axis A. As will be appreciated from FIGS. 2 and 3, when the cam and follower components are in the positions shown in FIGS. 2 and 6A, the pump is at the end of the intake stroke thereof, and when the cam and follower components are in the positions shown in FIGS. 3 and 6B, the pump is at the end of its discharge stroke.

Figure 7:
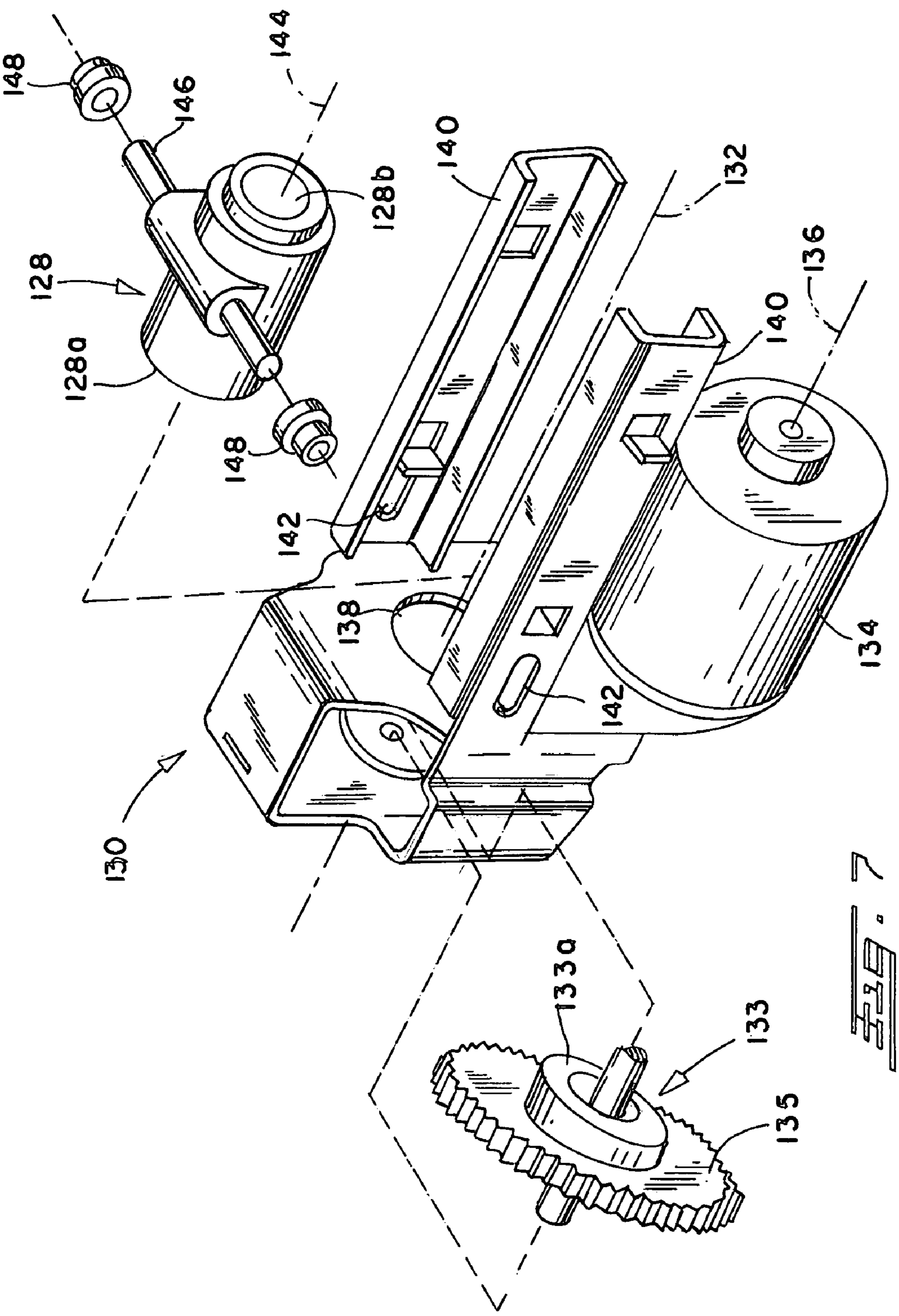

FIG. 7 illustrates another embodiment of a roller arrangement for supporting the axial reciprocation of a cam follower in a motor operated sprayer having a cam and cam follower arrangement for displacing the pump element. In this embodiment, a cam follower 128 is mounted on a motor and cam supporting frame 130 for reciprocation in opposite directions along an axis 132. A cam 133 which is integral with a drive gear 135 is mounted on support 130 for rotation about axis 132 to displace follower 128. Cam 133 is driven by a motor 134 through a gear train including gear 135 and a gear, not shown, mounted on the motor shaft. Motor 134 is mounted on support 130 and has an axis 136 offset from and parallel to axis 132. When mounted on the frame, cam follower 128 has an inner end 128*a* received in an opening 138 in the frame and cam 133 has an outer end 133*a* facing end 128*a* of the follower. As shown with respect to cam 133, ends 133*a* and 128*a* of the cam and cam follower have cam faces which are dual cam faces as described hereinabove, although the latter is not necessary in accordance with this aspect of the invention. The outer end 128*b* of the cam follower is configured for operative engagement with a pump operating component. Frame 130 includes a pair of axially extending parallel legs 140 above and on laterally opposite sides of axis 132, and each of the legs is provided with an axially elongate slot 142. Cam follower 128 has an axis 144 and is provided with an axle pin 146 extending transverse to and laterally offset from axis 144. The opposite ends of pin 146 rotatably receive rollers 148 of Acetyl, or the like, each of which is received in a corresponding one of the slots 142 to rollably support cam follower 128 during reciprocation thereof along axis 132.

While considerable emphasis has been placed herein on the structures and structural interrelationships between the component parts of the preferred embodiments of the invention, it will be appreciated that other embodiments can be made and that many changes can be made in the preferred embodiments without departing from the principles of the invention. In particular in this respect, it will be appreciated that the pump member can be provided other than by the preferred diaphragm component and, for example, could be in the form of a reciprocable piston, and axially collapsible bellows member, or the like. Further, while the cam and cam follower components are disclosed as having dual cam faces to obtain balanced lateral forces therebetween, it will be appreciated that the components can provide this balanced force relationship with three, four or more interengaging faces and with cam face configurations other than those disclosed and, for example, with sinusoidal cam faces. The foregoing and other modifications of the preferred embodiment as well as other embodiments of the invention will be obvious or suggested to those skilled in the art, whereby it is to be distinctly understood that the foregoing descriptive matter is to be interpreted merely as illustrative of the invention and not as a limitation.

Having thus described the invention, it is so claimed:

1. In a motor operated sprayer for a fluid supply container comprising a discharge opening, a variable volume pump having a pump axis and having axially spaced apart fixed and movable ends, said fixed end being in flow communication with said discharge opening, an inlet for connecting said pump with fluid in a supply container, an outlet for connecting said pump with said discharge opening, an electric motor, a cam rotatably driven by said motor, and a cam follower for displacing said movable end of said pump, whereby rotation of said cam axially displaces said movable end toward and away from said fixed end for pumping fluid from said container through said outlet and discharge opening, the improvement comprising said cam and said cam follower having interengaging cam faces for balancing lateral forces therebetween during rotation of said cam relative to said cam follower, said cam and said cam follower having an axis, each of said cam and said cam follower including a first cam face in a first plane intersecting the corresponding axis at a first angle thereto, and a second cam face in a second plane intersecting said first plane at a second angle thereto.

2. The sprayer according to claim 1, wherein said pump and discharge opening are coaxial.

3. The sprayer according to claim 1, wherein said motor has an output shaft rotatable about a motor axis parallel to said pump axis.

4. The sprayer according to claim 1, wherein said first and second angle are different.

5. The sprayer according to claim 4, including a spring biasing said cam follower axially toward said cam.

6. The sprayer according to claim 1, wherein said pump includes a support for axially slidably supporting said cam follower, said support and cam follower having rollers and slots interengaging to restrain relative rotation therebetween.

7. The sprayer according to claim 6, wherein said support includes a cylinder and said rollers and slots include diametrically opposite slots in said cylinder and rollers on said cam follower received in said slots.

8. The sprayer according to claim 1, wherein said first cam face of each said cam and cam follower has a first outer diameter, and said second cam face of each said cam and cam follower has a second outer diameter less than said first diameter.

9. The sprayer according to claim 8, wherein each of said first and second cam faces has an axially outermost and an axially innermost point on the corresponding diameter.

10. The sprayer according to claim 9, wherein the axially outermost points of the first and second cam faces of each said cam and cam follower are in a plane transverse to said axis thereof.

11. The sprayer according to claim 10, wherein the axially outermost points of the first and second cam faces of each said cam and cam follower are diametrically opposed.

12. The sprayer according to claim 11, wherein the axially innermost points of the first and second cam faces of each said cam and cam follower are in a plane transverse to the axis thereof.

13. The sprayer according to claim 12, wherein said pump includes a support for axially slidably supporting said cam follower, said support and cam follower having rollers and slots interengaging to restrain relative rotation therebetween.

14. The sprayer according to claim 13, wherein said support includes a cylinder and said rollers and slots include diametrically opposite slots in said cylinder and rollers on said cam follower received in said slots.

15. The sprayer according to claim 14, including a spring biasing said cam follower axially toward said cam.

16. The sprayer according to claim 8, wherein said pump includes a support for axially slidably supporting said cam follower, said support and cam follower having rollers and slots interengaging to restrain relative rotation therebetween.

17. The sprayer according to claim 16, wherein said support includes a cylinder and said rollers and slots include diametrically opposite slots in said cylinder and rollers on said cam follower received in said slots.

18. The sprayer according to claim 17, including a spring biasing said cam follower axially toward said cam.

19. In a motor operated sprayer for a fluid supply container comprising a discharge opening, a variable volume pump having a pump axis and having axially spaced apart fixed and movable ends, said fixed end being in flow communication with said discharge opening, an inlet for connecting said pump with fluid in a supply container, an outlet for connecting said pump with said discharge opening, an electric motor, a cam rotatably driven by said motor, a cam follower for displacing said movable end of said pump, whereby rotation of said cam axially displaces said movable end toward and away from said fixed end for pumping fluid from said container through said outlet and discharge opening, and said pump and cam follower including an interengaging arrangement designed coaxially slidably supporting said cam follower, the improvement comprising said interengaging arrangement including rollers on one of said pump and cam follower, and slots on the other receiving said rollers.

20. The sprayer according to claim 19, wherein said pump includes a support for said cam follower, said slots being in said support.

21. The sprayer according to claim 20, wherein said cam follower has an axis and said rollers are rotatable about an axis transverse to the axis of the cam follower.

22. The sprayer according to claim 21, wherein the axis of the rollers is spaced from the axis of the cam follower.

23. The sprayer according to claim 20, wherein said support includes a cylinder and said rollers and slots include diametrically opposite slots in said cylinder and rollers on said cam follower received in said slots.

* * * * *